(12) United States Patent
Nakao et al.

(10) Patent No.: US 7,403,706 B2
(45) Date of Patent: Jul. 22, 2008

(54) CAMERA

(75) Inventors: Soichiro Nakao, Asaka (JP); Satoru Goto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 346 days.

(21) Appl. No.: 11/349,127

(22) Filed: Feb. 8, 2006

(65) Prior Publication Data

US 2006/0182434 A1    Aug. 17, 2006

(30) Foreign Application Priority Data

Feb. 14, 2005   (JP) .............................. 2005-035722

(51) Int. Cl.
*G03B 15/03* (2006.01)
*G03B 17/02* (2006.01)
*G03B 17/18* (2006.01)
*G03B 31/00* (2006.01)

(52) U.S. Cl. ................. 396/176; 396/286; 396/312; 396/448; 348/371; 348/376

(58) Field of Classification Search ............... 396/176, 396/264, 263, 286, 281, 472, 376, 448, 535, 396/70, 163, 201, 202; 348/373
See application file for complete search history.

(56) References Cited

U.S. PATENT DOCUMENTS 6,641,311 B2 * 11/2003 Yoshida et al. .............. 396/448

2001/0017983 A1 * 8/2001 Tanaka ....................... 396/348
2002/0176714 A1 * 11/2002 Nakanishi et al. ........... 396/448

FOREIGN PATENT DOCUMENTS

| JP | 2004-348059 A | 12/2004 |
| JP | 2004-348069 A | 12/2004 |

* cited by examiner

*Primary Examiner*—W. B. Perkey
*Assistant Examiner*—Anthony Weathers
(74) *Attorney, Agent, or Firm*—Sughrue Mion, PLLC

(57) ABSTRACT

The present invention provides a camera in which a flash emission section is aligned with a self-timer light-emitting indicator section and the amount of slide of a slide door is minimized. The camera includes; a housing with an opening for an image-taking optical system and a first opening through which both the flash emission section and the self-timer light-emitting indicator section appear; and a slide door with a second opening having a cover partially attached thereto. The opening for the image-taking optical system, the first and second openings and the amount of slide of the slide door are arranged such that, when the slide door is closed, part of the first opening overlaps with part of the second opening and the overlapped part of the first opening is shielded by the cover provided in the second opening.

5 Claims, 16 Drawing Sheets

CAMERA

BACKGROUND OF THE INVENTION

1. Field of the Invention

The present invention relates to a camera that has an image-taking optical system and an image pickup device, and generates image data by forming object images on the image pickup device by the image-taking system.

2. Description of the Related Art

Recently digital cameras, which generate image data by forming an object image on an image pickup device, have been rapidly spread and have become smaller, thinner and diversified in their designs.

Many of such digital cameras have a protection member, for example, a slide door that opens and closes such that it opens a front of an image-taking optical system during image-taking operation and in the other times covers the front, in order to protect the image-taking optical system that appears through the front of the camera.

Usually, on the front of a camera, not only an aperture through which an image-taking optical system appears is formed, but a flash emission section for emitting flash for image-taking operation is also disposed. Accordingly many cameras have a protection member configured so as to open and close the front of the flash emission section as well as the front of the image-taking optical system (see, for example, Japanese Patent Application Publication Nos. 2004-348059, 2004-348069).

Additionally some cameras have a self-timer mode in which actual image-taking is performed after a lapse of predetermined time, for example, 10 seconds after preparatory image-taking operation is conducted. Such a camera has, on its front, a self-timer light-emitting indicator such as a LED to notify a user that image-taking operation in the self-timer mode is about to be performed.

Here, in view of the design of a camera, it is conceivable to decrease the number of openings on a slide door of a camera by aligning a flash emission section with a self-timer light-emitting indicator. In this case, the slide door needs to have a wider opening for the flash emission section and the self-timer light-emitting indicator.

However, configuring the slide door to slide by its width makes the amount of slide large and thus the size of a camera large, which is contrary to the demand for a smaller camera.

SUMMARY OF THE INVENTION

The present invention has been made in view of the above circumstances, and provides a camera in which a flash emission section is aligned with a self-timer light-emitting indicator section and the amount of slide of a slide door is minimized.

A camera according to the present invention has an image-taking optical system and an image pickup device, and generates image data by forming object images on the image pickup device by the image-taking optical system, the camera including:

a self-timer mode for performing actual image-taking predetermined seconds after preparatory image-taking operation;

a flash emission section that emits light in sync with image-taking;

a self-timer light-emitting indicator section which notifies a user that image-taking in the self-timer mode is about to start and is aligned with the flash emission section away from the image-taking optical system;

a housing having an opening for the image-taking optical system through which the image-taking optical system appears, and a first opening through which both the flash emission section and the self-timer light-emitting indicator section appear; and a slide door which opens and closes the opening for the image-taking optical system by sliding laterally over a front of the housing, and which has a second opening with a cover with light-diffusing and transmitting property, the second opening being arranged in front of the flash emission section and the self-timer light-emitting indicator section with the cover arranged in front of the self-timer light-emitting indicator section, when the slide door is opened, wherein the opening for the image-taking optical system, the first and second openings and the amount of slide of the slide door are arranged such that, when the slide door is closed, part of the first opening overlaps with part of the second opening and the overlapped part of the first opening is shielded by the cover provided in the second opening.

According to the present invention, the camera is configured such that, the flash emission section is aligned with the self-timer light-emitting indicator section and a cover with light-diffusing and transmitting property provided in the second opening of the slide door shields the self-timer light-emitting indicator section to compensate for decreased amount of slide of the slide door. Accordingly, the camera of the present invention can minimize the amount of slide of the slide door as well as meet the demand for compactness by aligning the self-timer light-emitting indicator section with the flash emission section.

DETAILED DESCRIPTION OF THE INVENTION

An embodiments of the present invention will be described below with reference to the attached drawings.

Figure 1:
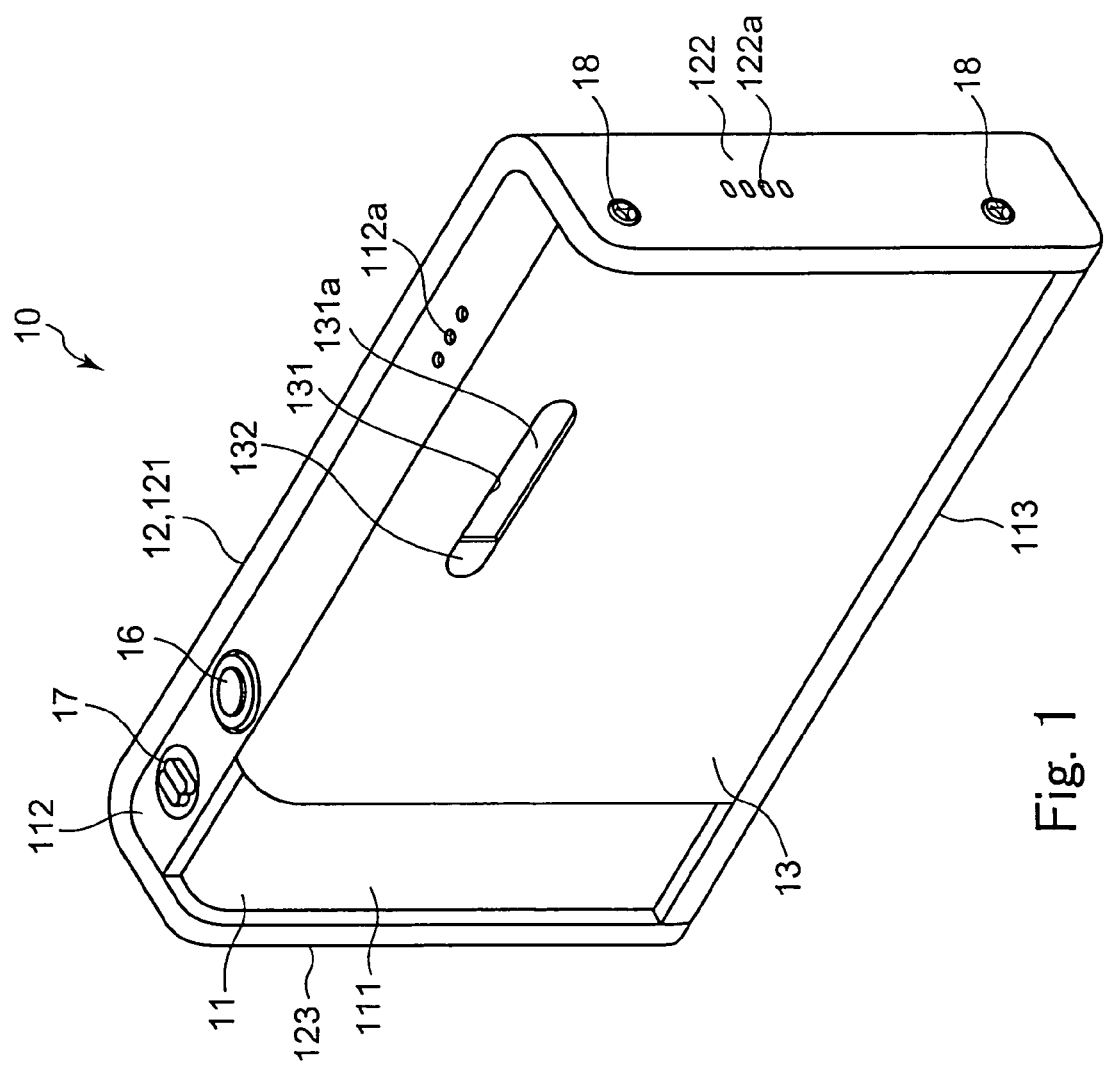
FIG. 1 is a perspective view of a front of a camera viewed obliquely from above, with its slide door closed according to one embodiment of the present invention.
Figure 2:
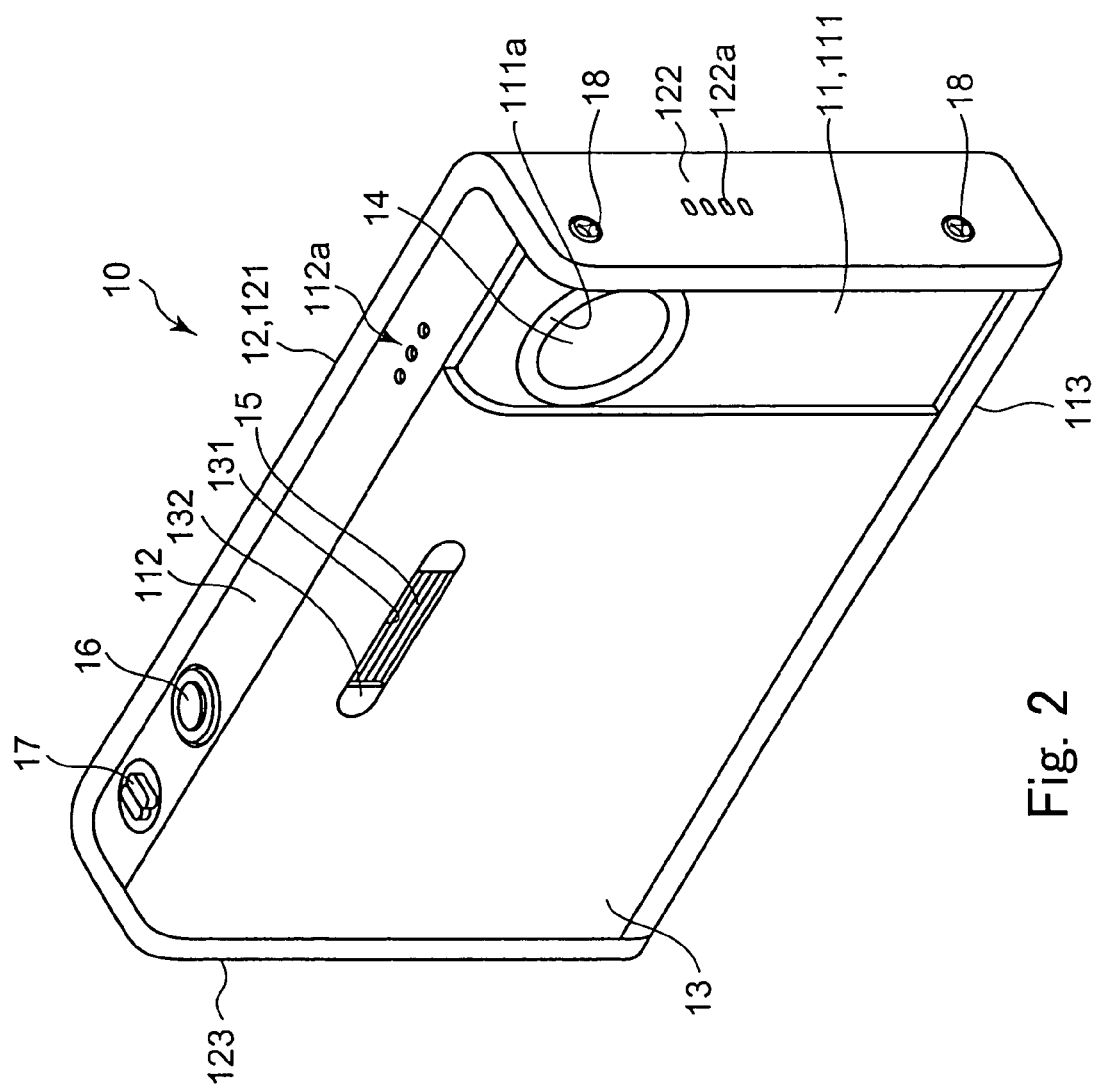
FIG. 2 is a perspective view of the front of the camera viewed obliquely from above, with its slide door opened according to the one embodiment of the present invention.
Figure 3:
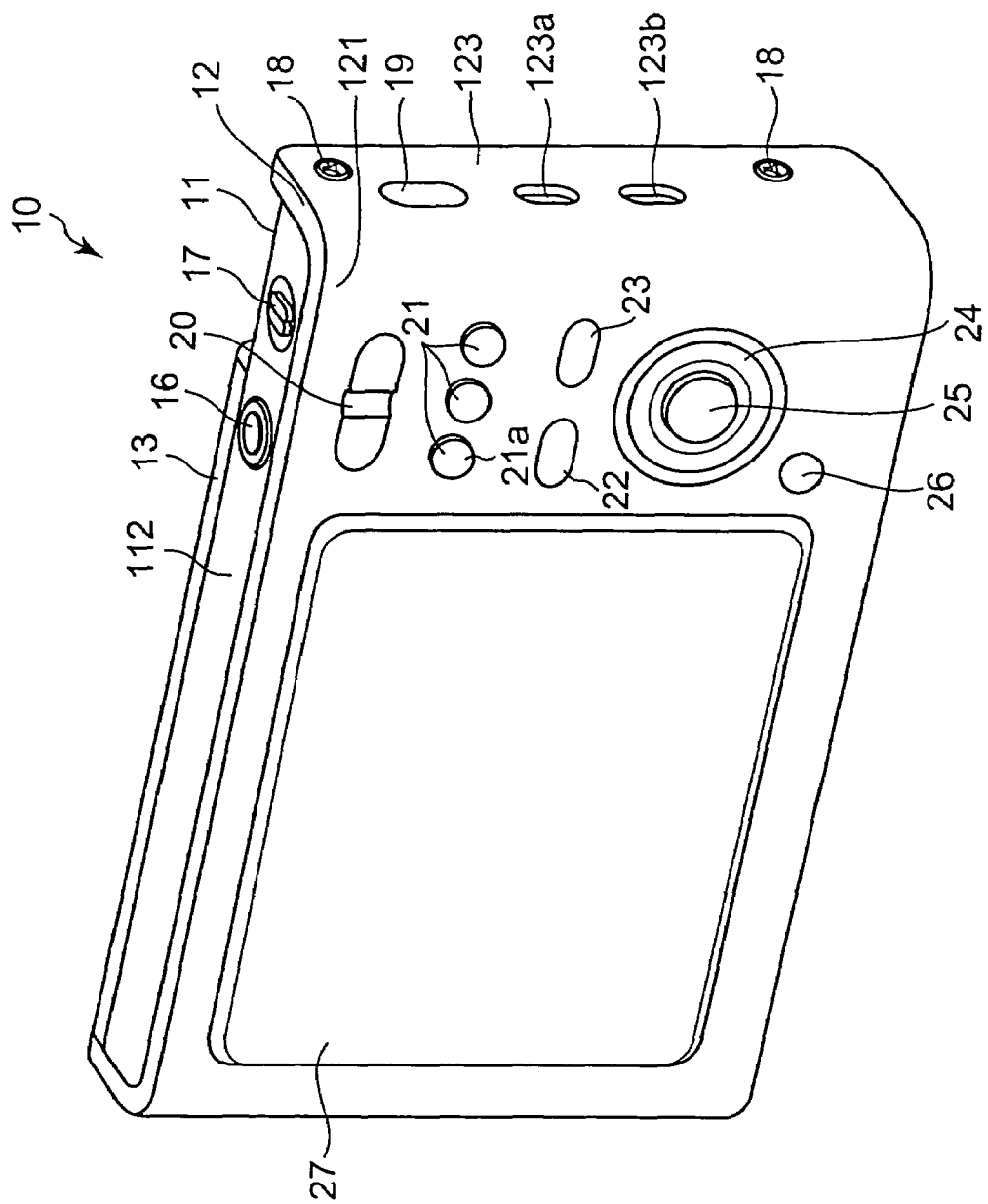
FIG. 3 is a perspective view of a back of the camera shown in FIGS. 1 and 2 and viewed obliquely from above.

FIGS. 1 and 2 respectively show a perspective view of a front of a camera 10 viewed obliquely from above, with its slide door closed and opened according to one embodiment of the present invention. FIG. 3 is a perspective view of a back of the camera 10 shown in FIGS. 1 and 2 and viewed obliquely from above.

The view of the camera 10 shown in FIGS. 1 through 3 mainly consists of a front housing 11, back housing 12 and a slide door 13.

The front housing 11 further consists of a front 111, a top 112 and a bottom 113 while the back housing 12 consists of a back 121 and sides 122 and 123. The slide door 13 slides laterally in contact with the front 111 of the front housing 11.

The slide door 13 can slide between a closed position shown in FIG. 1 and an opened position shown in FIG. 2. The slide door 13 is configured such that, in the opened position it opens an opening 111a for image-taking operation and a front of an image-taking lens 14 that appears through the opening 111a while in the closed position it covers the opening 111a and the front of the image-taking lens 14.

An oblong opening 131 is provided on an upper part of substantial center of the slide door 13. Part of the opening 131, which is closer to the image-taking lens 14, is penetrated from its front to its back, while other part, which is farther away from the image-taking lens 14, has a cover fitted thereto made of a member with light-diffusing and transmitting property such as opalescent acryl. When the slide door 13 is in the closed position shown in FIG. 1, the front 111 of the front housing 11 appears through the penetrated part 131a of the opening 131 of the slide door 13. When the slide door 13 is in the opened position shown in FIG. 2, the opening 131 of the slide door 13 opens a front of a flash emission section 15 that emits light for image-taking with flash light. Meanwhile the camera 10 has a self-timer mode in which actual image-taking is performed 10 seconds after a shutter button 16 is depressed. When the slide door 13 is in the closed position, a LED for a self-timer is arranged behind the cover 132 with light-diffusing and transmitting property, which notifies a user that image-taking is about to start by blinking slowly for seven seconds after the shutter button 16 is depressed and then rapidly blinking for the remaining 3 seconds.

Additionally the front housing 11 has, on the top 112, the shutter button 16, a still/movie-shooting switching lever 17, a mouthpiece 112a for transmitting sound to a built-in microphone, in addition to the opening 111a on the front 111 as described before.

The back housing 12 is fixed to the front housing 11 with four screws 18 on the right and left sides of the back housing 12. An ear piece 122a for transmitting sound from a built-in speaker is provided on the side 122 of the back housing 12 near the image-taking lens 14 as shown in FIG. 2. Additionally, as shown in FIG. 3, an infrared communication section 19 is provided on the other side 123 of the back housing 12 for transmitting data of an image taken by the camera 10 via infrared communication. Under the infrared communication section 19, holes 123a and 123b are formed for attaching a strap thereto.

On the back 121 of the back housing 12, provided are Telephoto/Wide (T/W) switching lever 20, antiskid members 21, shooting/replay switching lever 22, function button 23, navigation button 24, OK button 25, Disp/Back button 26, and LCD panel 27 for screen display.

The T/W switching lever 20 is for controlling focal distance of the image-taking lens 14 of FIG. 2. The antiskid members 21 guide a thumb of a user's right hand and prevent it from slipping, so that the user can securely hold the camera 10 during shooting without making the mistake of pressing an undesired button. The antiskid members 21 are formed of opalescent member with light-diffusing and transmitting property such as silicone rubber, and consists of three parts slightly protruding from the surface of the back 121. The innermost 21a of the three parts has a LED behind thereof that illuminates when the camera 10 is charged.

Additionally, the shooting/replay switching button 22 alternatively changes to the shooting mode or the replay mode by one press.

When the function button 23 is depressed, a menu is displayed on the LCD panel 27. The menu is changed by using right/left buttons of the navigation button 24 and then an item of the menu is selected by using up/down buttons of the navigation button 24. Setting of the selected item, for example, ISO sensitivity, with/without flash and other detailed item for shooting/replay mode, is performed by pressing the OK button 25.

Further, the Disp/Back button 26 is pressed, for example, when the display mode of images displayed on the LCD panel 27 is to be changed to "display only one image" or to "display some thumbnail images in a line," and when immediately preceding image is to be displayed.

Figure 4:
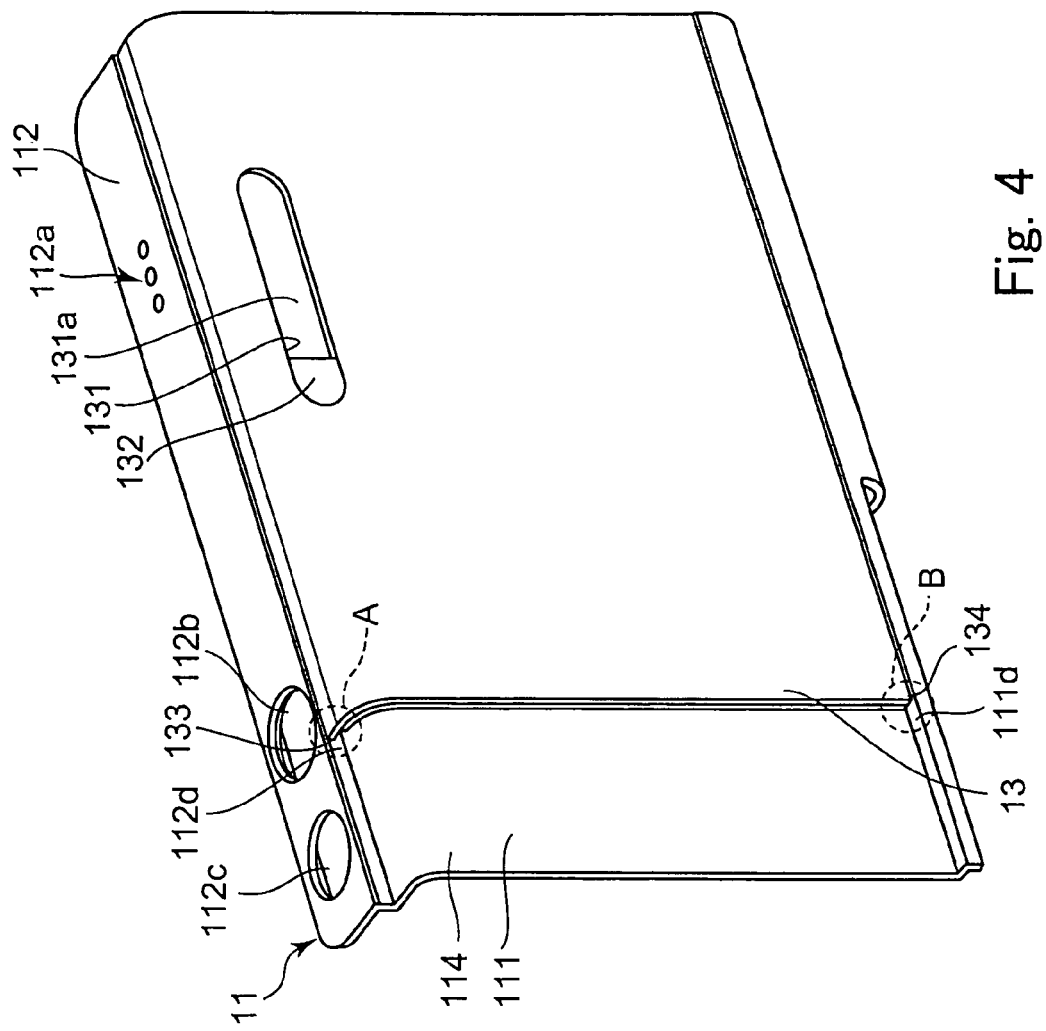
FIG. 4 shows a front housing and a slide door attached to the front thereof of the camera shown in FIGS. 1 through 3.
Figure 5:
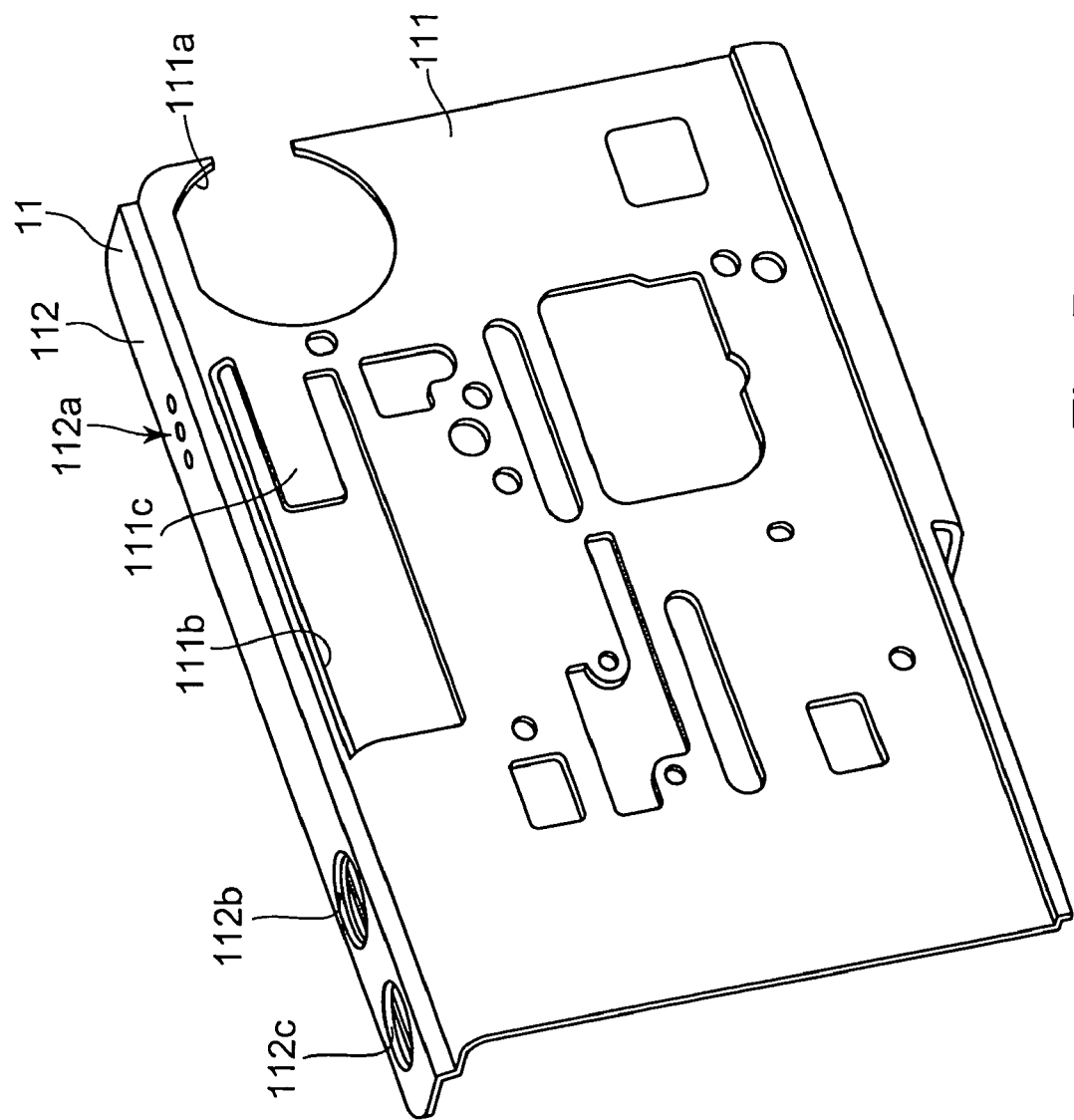
FIG. 5 shows the front housing of FIG. 4 with the slide door removed.
Figure 6:
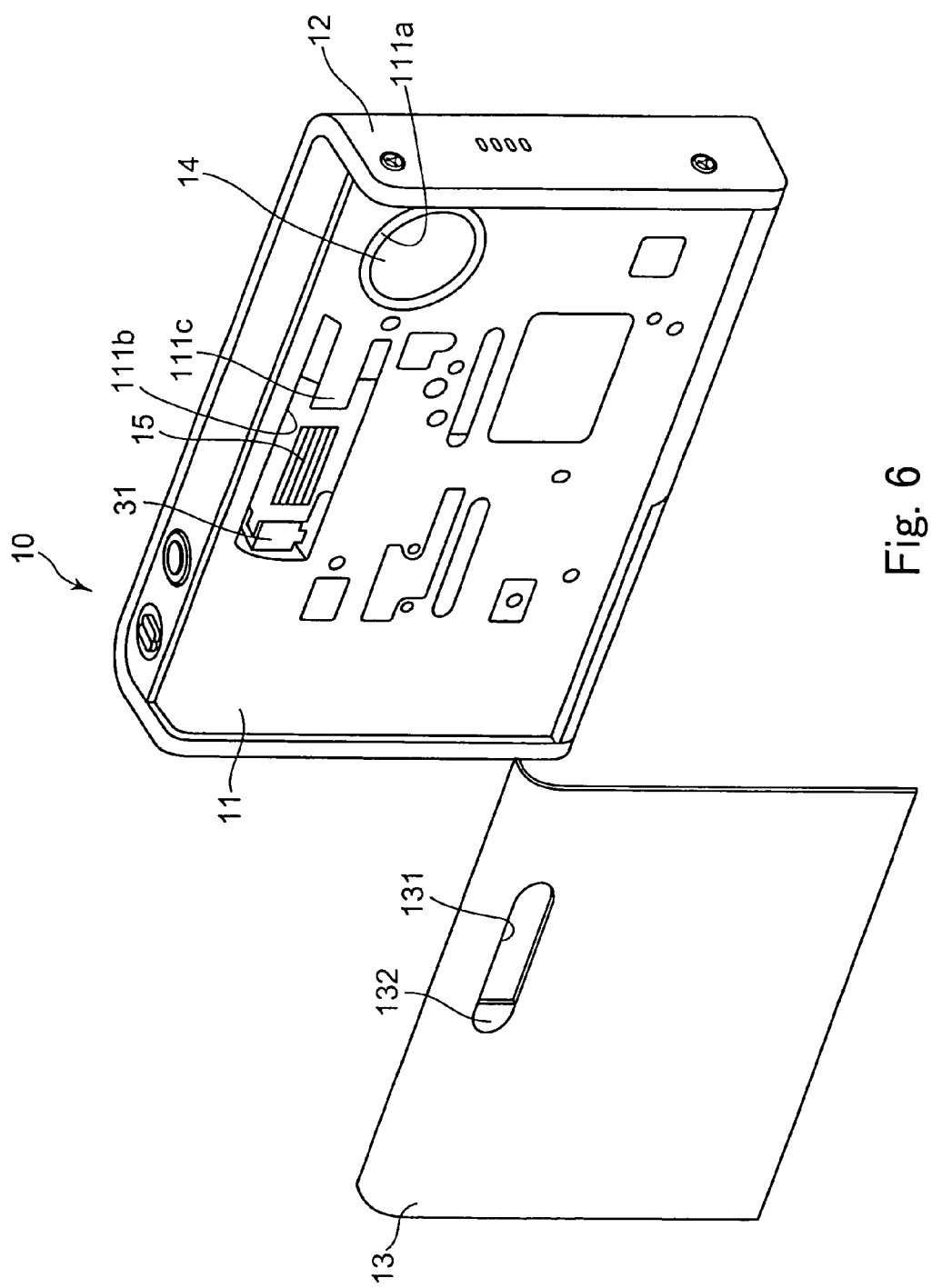
FIG. 6 shows a front of the front housing of the camera with the slide door removed therefrom.

FIG. 4 shows the front housing 11 and the slide door 13 attached to the front 111 thereof of the camera 10 shown in FIGS. 1 through 3, FIG. 5 shows the front housing 11 with the slide door 13 removed therefrom and FIG. 6 shows a front of the front housing 11 of the camera 10 with the slide door removed therefrom. Incidentally, drawing is omitted for components which are supposed to be disposed behind the openings on the front 111 of the front housing 11.

FIG. 5 shows openings 112b and 112c formed in the top 112 of the front housing 11 respectively for the shutter button 16 and the still/movie-shooting switching lever 17, in addition to the mouth piece 112a described before. FIG. 5 also shows openings formed in the front 111 of the front housing 11, including an opening 111b for the flash emission section 15 and a LED 31 for a self-timer of FIG. 6 in addition to the opening 111a described before.

When the slide door 13 is moved to the open position shown in FIG. 2, the penetrated part 131a of the opening 131 of the slide door 13 is arranged in front of the flash emission section 15 and the cover 132 with light-diffusing and transmitting property is arranged in front of the LED 31 for a self-timer. On the other hand, when the slide door 13 is in the closed position shown in FIG. 1, the penetrated part 131a of the opening 131 is arranged in front of a shield 111c that extends in a cantilever-beam form within the opening 111b of the front 111 of the front housing shown in FIGS. 5 and 6. Thus, part of the front housing 11 (the shield 111c) can be seen from the penetrated part 131a of the opening 131 of the slide door 13. On the other hand, the other part of the opening into which the cover 132 is fitted overlaps with part of the flash emission section 15, so that the flash emission section 15 cannot be seen from the front of the camera 10.

Accordingly, the camera 10 according to the embodiment can minimize the amount of slide of the slide door 13 despite that the flash emission section 15 is aligned with the LED 31 for a self-timer, can shield the flash emission section 15 when the slide door 13 is closed, and thus is compact and excellent in its design.

Now, explanation will be made on the structure of portions enclosed with circles A and B shown in FIG. 4.

Part of the top 112 of the front housing 11 that extends from the front 111 in a curve is in contact with the rear of the slide door 13. Here, the part of the top 112 together with the front 111 is called a contact surface 114. On the top and bottom ends of the contact surface 114, provided are walls 112d and 111d that are erect with respect to the contact surface 114 and face to extend along top and bottom end surfaces 133 and 134 of the slide door 13. Now, further explanation will be made on the wall 112d as a representative.

Figure 7:
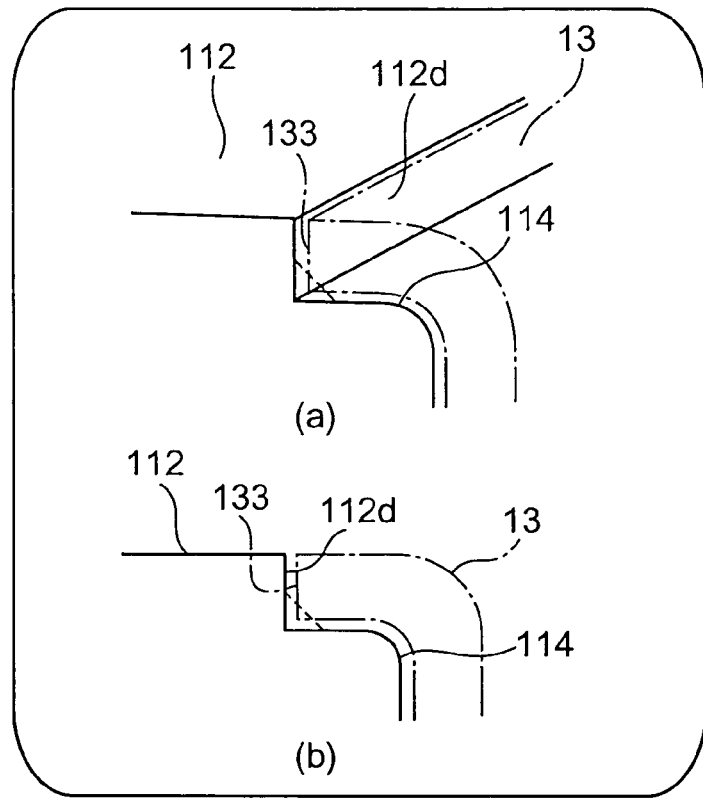
FIG. 7 is a comparative example to show a structure of part of a wall formed at the top of a front housing according to one of conventional techniques.
Figure 8:
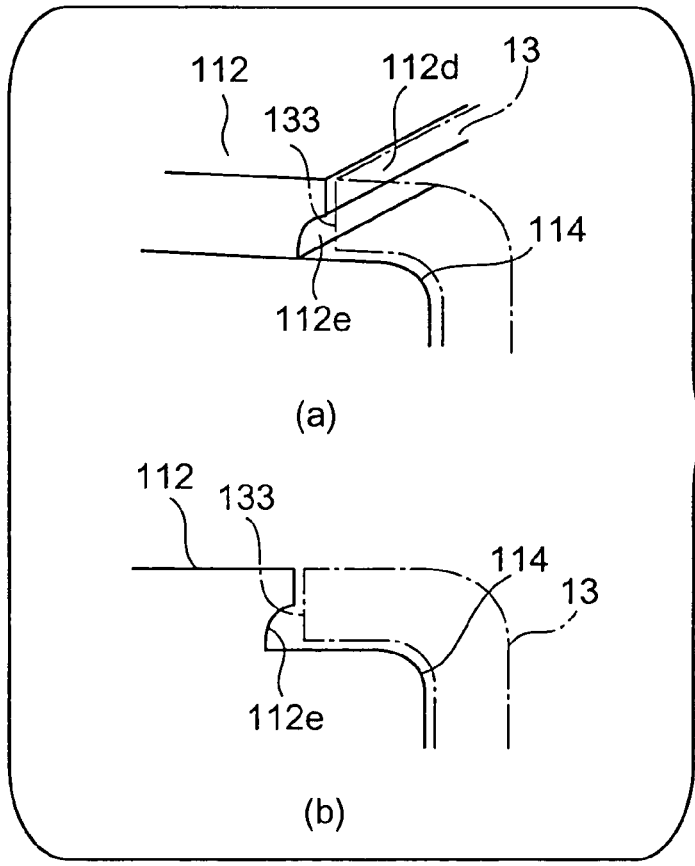
FIG. 8 shows a structure of part of a wall formed at the top of the front housing according to the embodiment.

FIGS. 7 and 8 both show a structure of part of the wall 112d disposed at the top 112 of the front housing 11, but FIG. 7 is a comparative example according to one of conventional techniques while FIG. 8 is according to the embodiment.

FIGS. 7 and 8 show the front housing 11 in solid lines and the slide door 13 in chain lines. Part (a) of FIG. 7 and Part (a) of FIG. 8 are perspective views while Part (b) of FIG. 7 and Part (b) of FIG. 8 are side views.

On the front housing 11, the wall 112d is formed, which is erect relative to the contact surface 114 and faces to extend along the top end surface 133 of the slide door 13.

Incidentally, the front housing 11 of the present embodiment is formed by extrusion molding. A protrusion of a mold, which is a recess of a product, wears out from use. Therefore, the shape of the wall 112d shown in Part (a) of FIG. 7, which is assumed to be formed by a mold initially put into use, will change due to worn-out protrusion of the mold and fill a recess between the wall 112d and the contact surface 114 as shown in a dotted line of Part (b) of FIG. 7. Consequently, the top surface 133 of the slide door 13 does not fit to the wall 112d, resulting in a gap between them and deteriorating the design of the camera. In the worst case, a camera cannot be assembled properly to become an imperfect product and eventually the life of its mold is shortened.

On the other hand, according to the camera of the present embodiment of FIG. 8, a groove 112e is formed in the wall 112d, which is in contact with the contact surface 114 and recessed away from and extending along the top surface 113 of the slide door 13.

Presence of the groove 112e secures fitting of the slide door 13 to the front housing 11 even when the edge of groove 112e is partially filled due to a worn-out protrusion of a mold. In addition, as the groove 112e is formed at the bottom of the wall 112d (closer to the contact surface 114), it is not readily noticeable in the appearance of the camera and is desirable in terms of the camera design.

Figure 9:
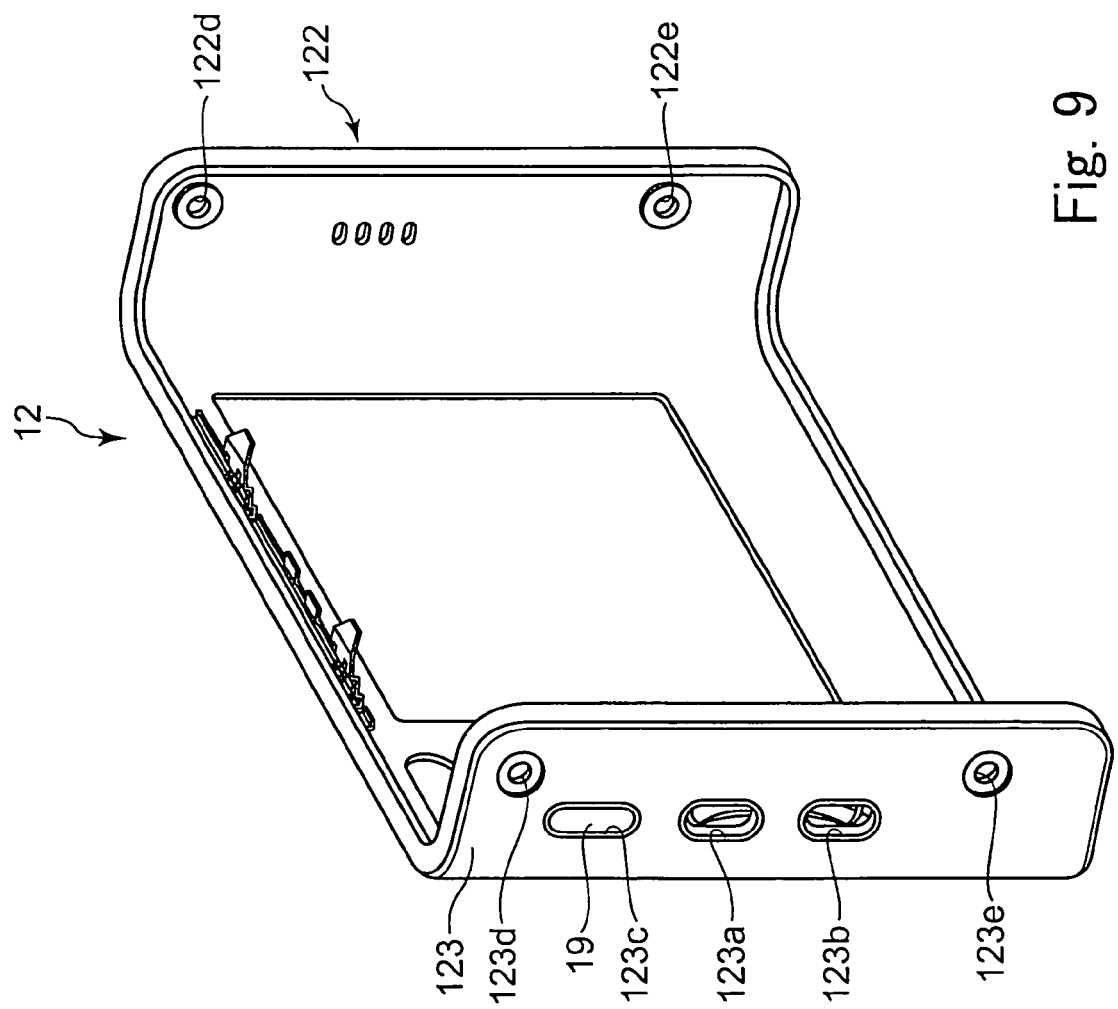
FIG. 9 is a perspective view of a rear side of a back housing.
Figure 10:
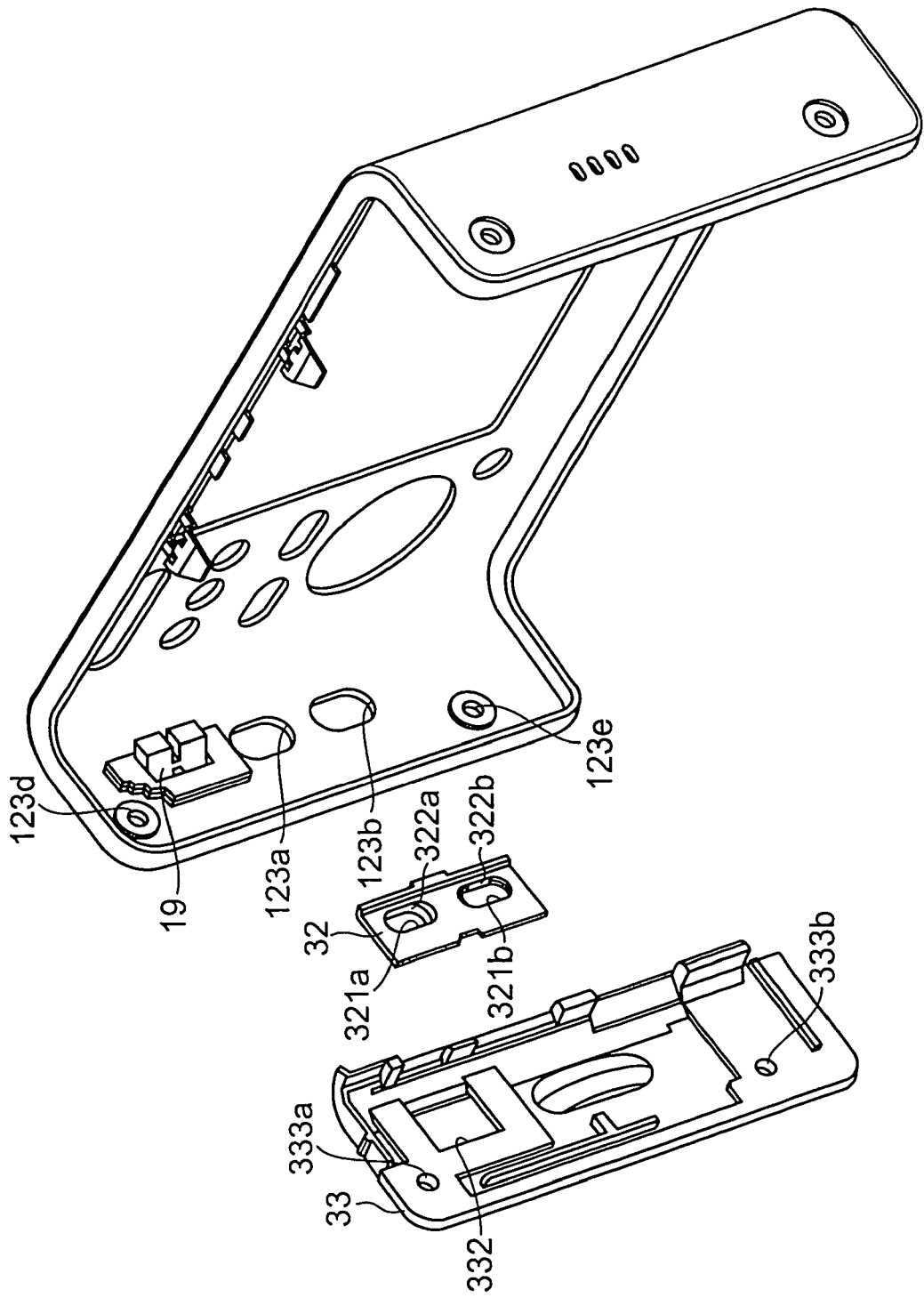
FIG. 10 is an exploded perspective view of parts for attaching a strap to the back housing.
Figure 11:
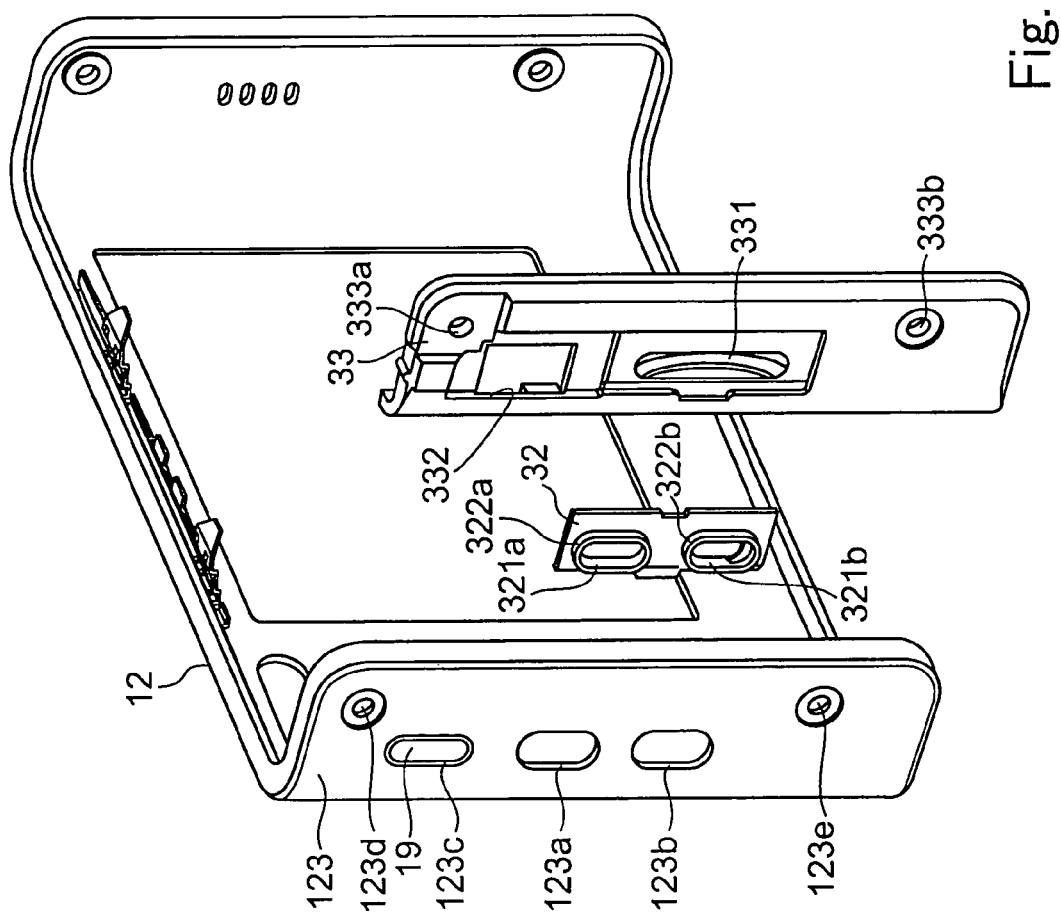
FIG. 11 is another exploded perspective view of the parts for attaching a strap to the back housing.

FIG. 9 is a perspective view of a rear side of the back housing 12 and FIGS. 10 and 11 are exploded perspective view at different angles of parts for attaching a strap to the back housing.

As shown in FIG. 9, on the side 123 of the back housing 12, formed are an opening 123c provided with the infrared communication section 19 shown in FIG. 10 and a pair of holes 123a and 123b for attaching a strap thereto. Additionally, four holes for screws 123d, 123e, 122d and 122e are formed on the side 123 and the other side 122 of the back housing 12 in order to secure the back housing 12 to the front housing 11.

The holes 123a and 123b for a strap are fitted with a protection member 32 shown in FIGS. 10 and 11, a back of which a retaining member 33 is further attached to.

The protection member 32 has holes 321a and 321b corresponding to the holes 123a and 123b. The holes 321a and 321b respectively have walls 322a and 322b that are formed around and erect relative to their peripheries. Height of the walls 322a and 322b are same as thickness of the back housing 12 while depth of the holes 321a and 321b corresponds to the sum of thickness of the back housing 12 and the protection member 32.

In the embodiment, walls 322a and 322b of the protection member 32 are fitted to the holes 123a and 123b for a strap on the side 123 of the back housing 12. Incidentally, the back housing 12 is made as thin as it allows for holding required strength in order to meet the demand for compactness and reduction in weight and cost. Therefore, if a strap is in direct contact with the holes 123a and 123b, the strap is likely to be damaged and cut during use.

In the present embodiment, however, the protection member 32 is fitted to the holes 123a and 123b, so that a strap contacts inner walls of the holes 321a and 321b of the protection member 32 and is prevented from damage.

Additionally, a path 331 is formed on the retaining member 33 for guiding a strap, for example, from the hole 123a to the 123b to facilitate attaching the strap. The retaining member 33 also has an opening 332 formed therein for having components of the infrared communication section 19 protruding through the opening 332 to the rear side of the back housing 12 and holding the periphery of the components by pressure. Further, the retaining member 33 has holes 333a and 333b linked to holes 123d and 123e for screws formed on the side 123 of the back housing 12. Accordingly, the retaining member 33 as well as the back housing 12 are secured to the front housing 11 by screws 18 shown in FIG. 3, so that the components of the infrared communication section 19 and the protection member 32 for a strap can be firmly fitted to the respective openings 123c, 123a and 123b by the retaining member 33.

Figure 12:
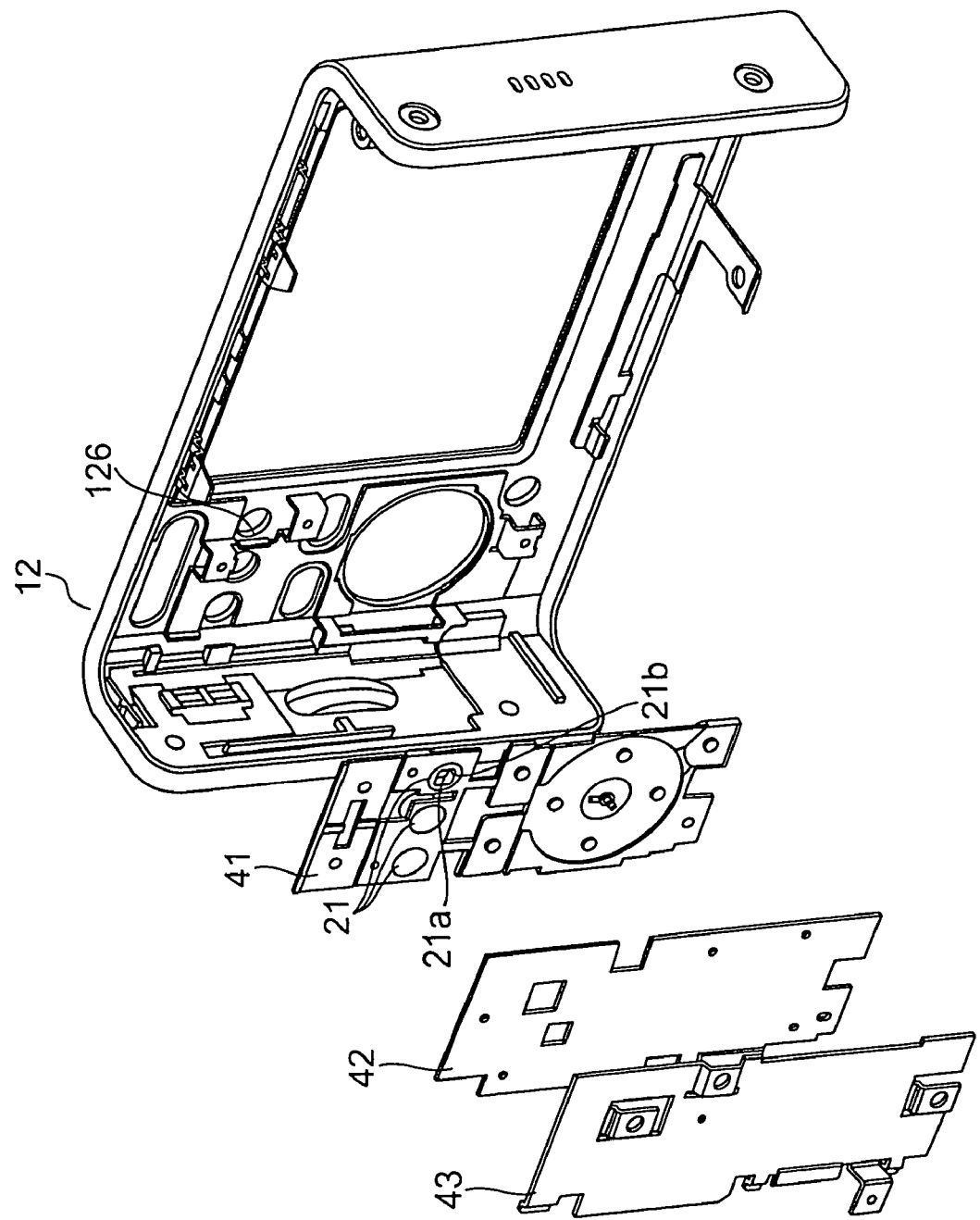
FIG. 12 is an exploded perspective view of parts for the back of the camera.
Figure 13:
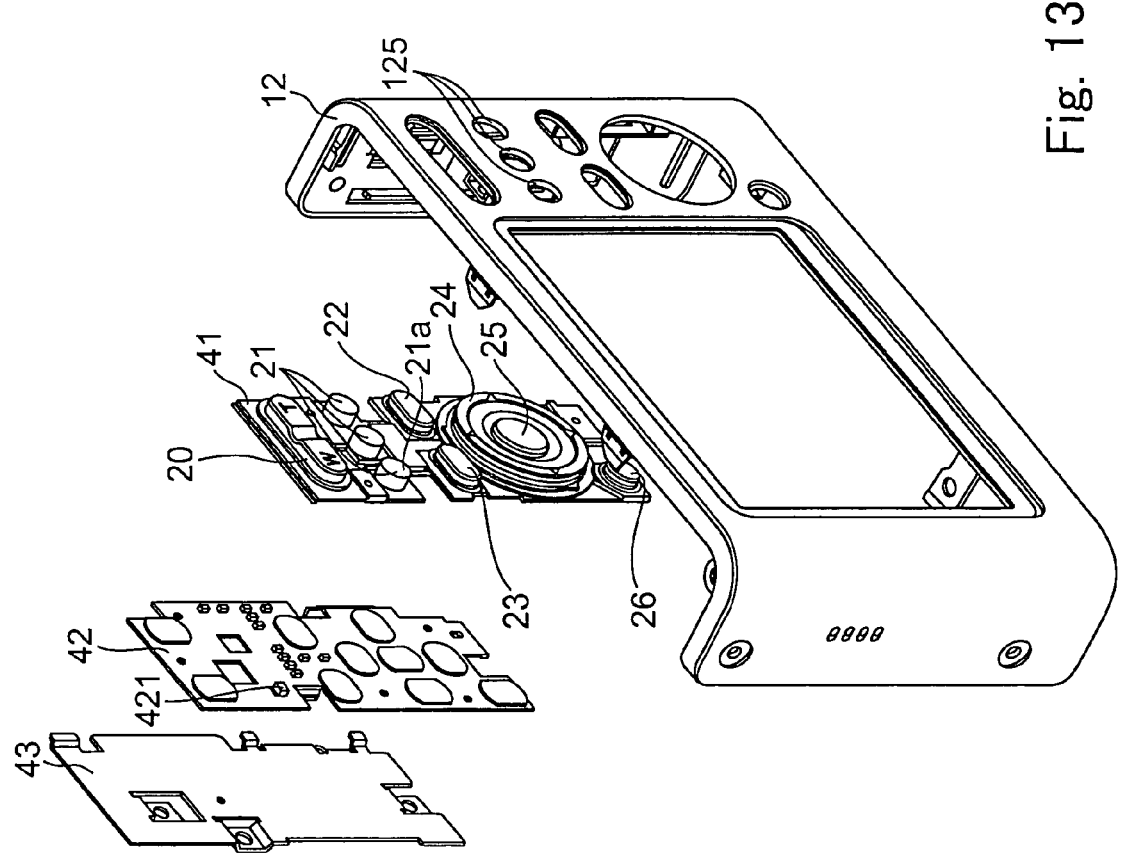
FIG. 13 is another exploded perspective view of the parts for the back of the camera.

FIGS. 12 and 13 are respectively an exploded perspective view at different angles of parts for the back of the camera 10.

FIGS. 12 and 13 show a prefabricated structure of the antiskid members 21 and buttons to be arranged on the back 121 of the camera 10 including: the T/W switching lever 20, the shooting/replay switching lever 22, the function button 23, the navigation button 24, the OK button 25 and the Disp/Back button 26. Specifically, an operator panel 41 with the buttons and the antiskid members 21 arranged thereon is placed inside the back housing 12. Inside the operator panel 41 a sensor substrate 42 is placed, inside of which a fixing member 43 is further placed to secure the sensor substrate 42 and the operator panel 41 to the inside of the back housing 12.

The antiskid members 21 and the buttons arranged on the operator panel 41 are placed so as to be fitted into openings formed in the back housing 12. For example, the three protrusions constituting the antiskid members 21 are fitted into their respective openings 125 formed in the back housing 12.

The antiskid members 21 are configured such that the innermost protrusion 21a has a recess 21b into which a LED 421 on the sensor substrate is fitted. The antiskid members 21 are formed of members with light-diffusing and transmitting property. Therefore, the antiskid members 21 not only guide a thumb of a user's right hand and prevent slip of the thumb, but also indicates that the camera is being charged. This feature contributes to reduction in size of a camera.

Additionally, a shield 126 is provided inside the back housing 12 as shown in FIG. 12, and thus when the LED 421 is lit it lights only the innermost protrusion 21a.

Figure 14:
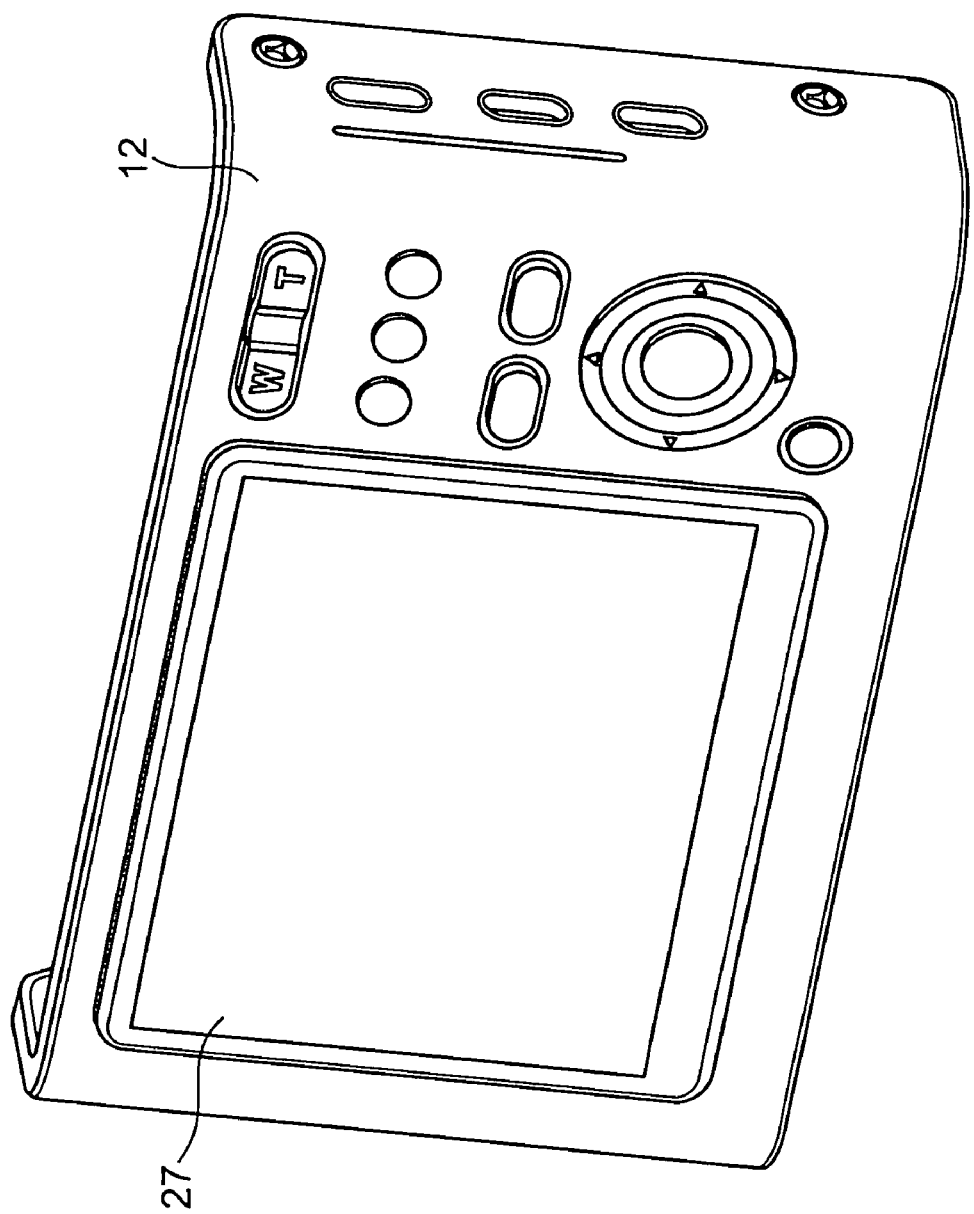
FIG. 14 is a perspective view of the back housing with various buttons attached thereto.
Figure 15:
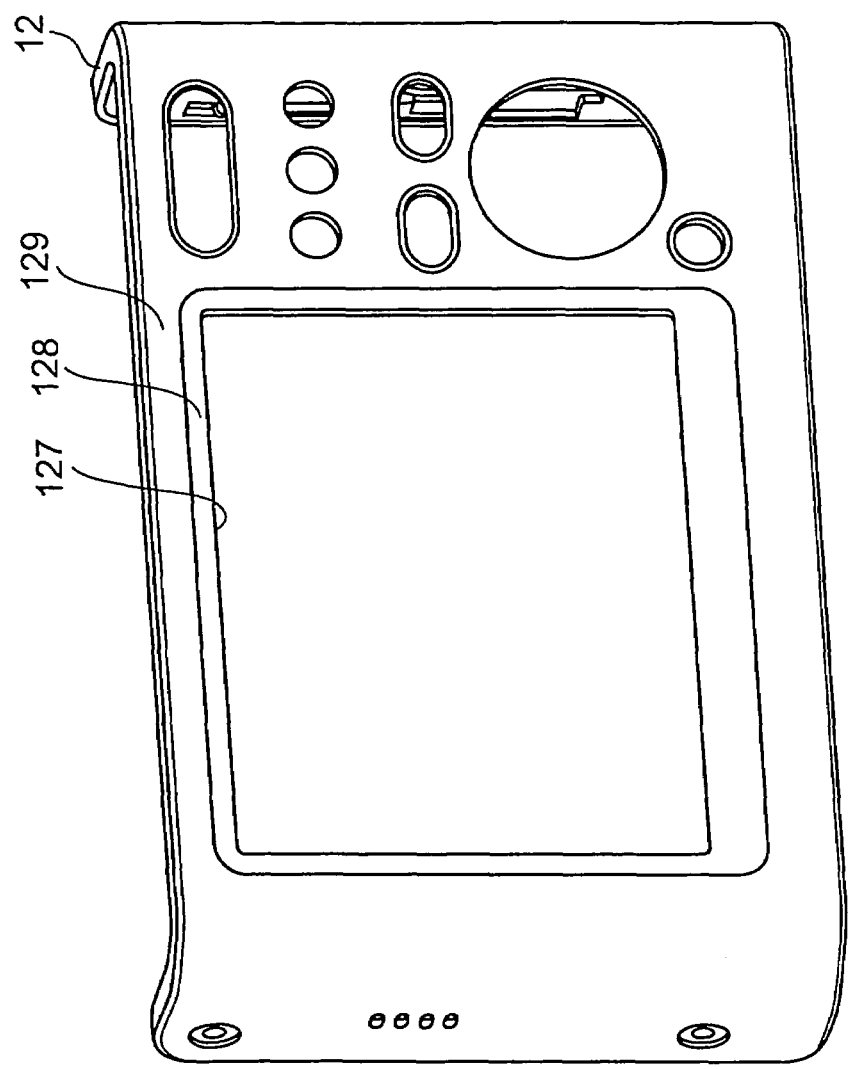
FIG. 15 is a perspective view of the back housing with various buttons removed therefrom.
Figure 16:
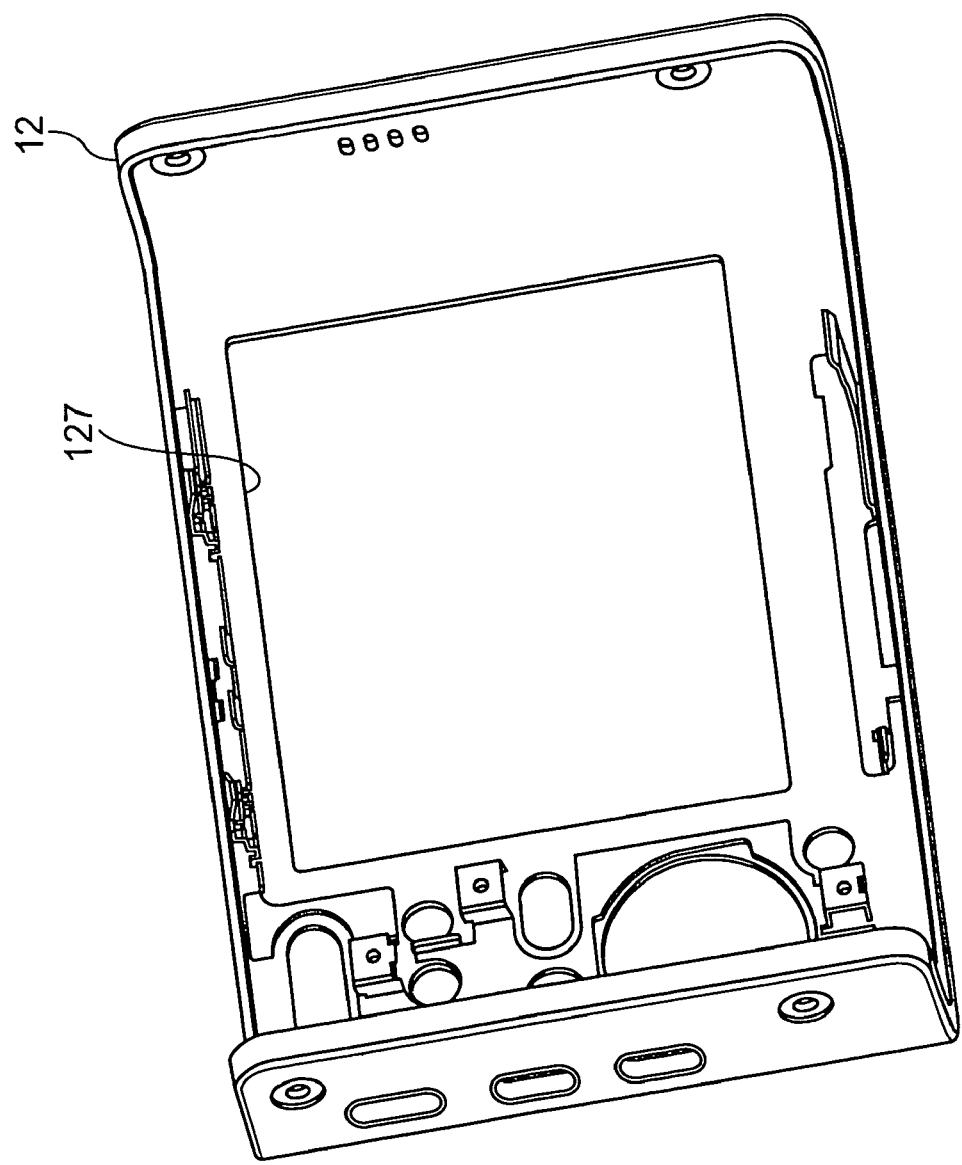
FIG. 16 is a perspective view of the back housing viewed from its inside.

FIG. 14 is a perspective view of the back housing 12 with various buttons attached thereto, FIG. 15 is a perspective view of the back housing 12 with various buttons removed therefrom, and FIG. 16 is a perspective view of the back housing 12 viewed from its inside.

As shown in FIGS. 15 and 16, a large opening 127 is formed for the LCD panel 27 in the back housing 12. A frame 128 is formed on the periphery of the opening 127. The frame 128, at the outside of the back housing 12, is recessed (with decreased thickness) from an adjacent section 129, but is flush with the adjacent section 129 at the inside of the back housing 12.

Figure 17:
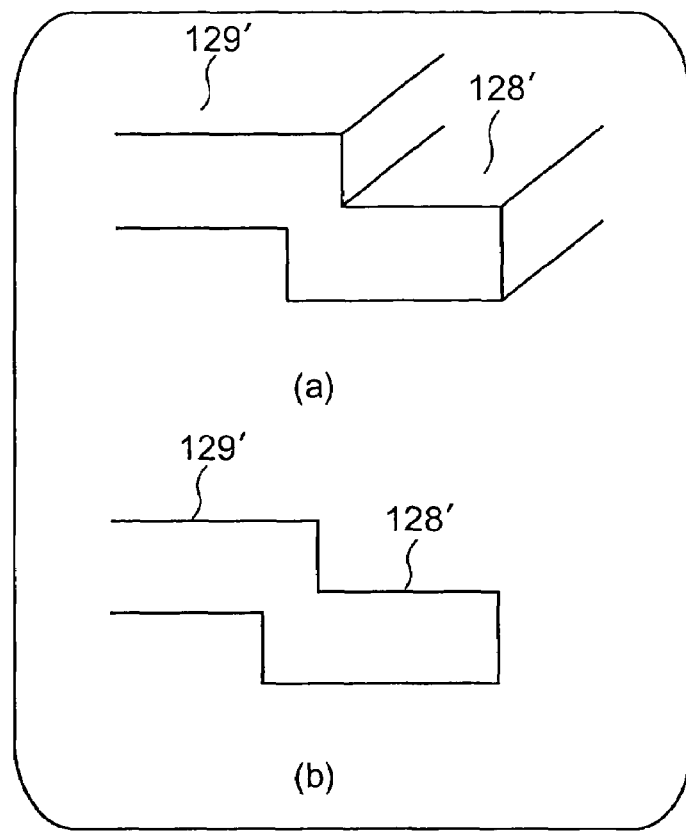
FIG. 17 is a comparative example to show a structure of the periphery of an opening where a LCD panel is disposed according to one of conventional techniques.
Figure 18:
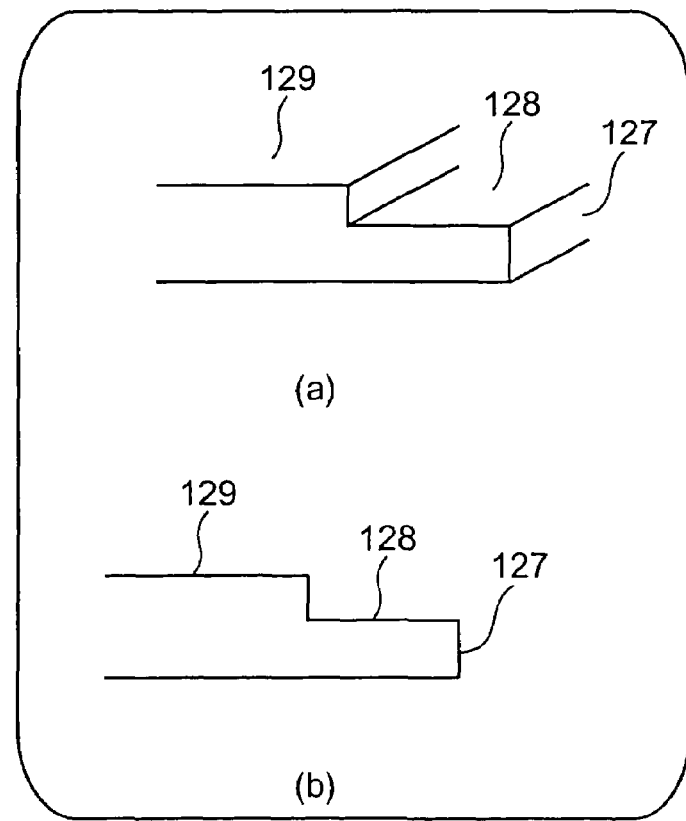
FIG. 18 shows a structure of the periphery of an opening where a LCD panel is disposed according to the embodiment.

FIG. 17 is a comparative example to show a structure of the periphery of an opening where a LCD panel is arranged according to one of conventional techniques and FIG. 18 shows a structure of the periphery of the opening 127 where the LCD panel 27 is arranged according to the present embodiment.

As shown in FIG. 17, conventionally a frame 128' at its inside is protruded from an adjacent section 129' as the frame 128' at the outside is recessed from the adjacent section 129'. In this case, space behind the frame 128' cannot be fully made use of due to protrusion, which is problematic in terms of realizing a compact camera.

On the other hand, according to the present embodiment, the frame 128 is formed by compressing part of a plate with uniform width. Thus, the frame 128 at the inside is flush with the adjacent section 129 although it has a recess from the adjacent section 129 at the outside.

Accordingly, the frame 128 allows space for components as well as supports the LCD panel securely by its recess. Although the frame 128 becomes thinner by its recess, its strength is maintained supported by the thicker adjacent section 129 in contact with its periphery.

What is claimed is:

1. A camera which has an image-taking optical system and an image pickup device, and generates image data by forming object images on the image pickup device by the image-taking optical system, the camera comprising:
   - a self-timer mode for performing actual image-taking predetermined seconds after preparatory image-taking operation;
   - a flash emission section that emits light in sync with image-taking;
   - a self-timer light-emitting indicator section which notifies a user that image-taking in the self-timer mode is about to start and is aligned with the flash emission section away from the image-taking optical system;
   - a housing having an opening for the image-taking optical system through which the image-taking optical system appears, and a first opening through which both the flash emission section and the self-timer light-emitting indicator section appear; and
   - a slide door which opens and closes the opening for the image-taking optical system by sliding laterally over a front of the housing, and which has a second opening with a cover with light-diffusing and transmitting property, the second opening being arranged in front of the flash emission section and the self-timer light-emitting indicator section with the cover arranged in front of the self-timer light-emitting indicator section, when the slide door is opened,
   - wherein the opening for the image-taking optical system, the first and second openings and the amount of slide of the slide door are arranged such that, when the slide door is closed, part of the first opening overlaps with part of the second opening and the overlapped part of the first opening is shielded by the cover provided in the second opening.

2. The camera according to claim 1, wherein the cover is fitted into the second opening of the slide door.

3. The camera according to claim 1, wherein the housing further has a mouthpiece that transmits sound to a built-in microphone.

4. The camera according to claim 1, wherein the housing further has an antiskid member disposed on a back thereof, which is opposite the front where the opening for the image-taking optical system is formed, the antiskid member preventing the thumb of the right hand of a user from slipping when the user holds the camera with the right hand during shooting.

5. The camera according to claim 1, wherein the housing further has:
   - a contact surface that is overlapped by and contacts the slide door,
   - a wall that extends along an end surface of the slide door, and
   - a groove that is formed in the wall such that the groove meets the contact surface, the groove being recessed away from and extending along the end surface of the slide door.

* * * * *